United States Patent
Eda et al.

(10) Patent No.: US 10,585,712 B2
(45) Date of Patent: Mar. 10, 2020

(54) OPTIMIZING A WORKFLOW OF A STORLET ARCHITECTURE

(71) Applicant: International Business Machines Corporation, Armonk, NY (US)

(72) Inventors: Sasikanth Eda, Pune (IN); Deepak R. Ghuge, Sangamner (IN); Kaustubh I. Katruwar, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 15/610,207

(22) Filed: May 31, 2017

(65) Prior Publication Data

US 2018/0349197 A1 Dec. 6, 2018

(51) Int. Cl.
*G06F 9/46* (2006.01)
*G06F 9/50* (2006.01)

(52) U.S. Cl.
CPC ...... *G06F 9/5055* (2013.01); *G06F 2209/501* (2013.01)

(58) Field of Classification Search
CPC .......................... G06F 9/5055; G06F 2206/501
See application file for complete search history.

(56) References Cited

U.S. PATENT DOCUMENTS

| | | | |
|---|---|---|---|
| 8,700,875 B1 | 4/2014 | Barron et al. | |
| 8,750,161 B1* | 6/2014 | Matthews | H04W 40/02 370/254 |
| 8,826,279 B1 | 9/2014 | Pacheco et al. | |
| 8,930,542 B2 | 1/2015 | Ashok et al. | |
| 9,501,493 B1 | 11/2016 | Banerjee et al. | |
| 2009/0248974 A1* | 10/2009 | Bello | G06F 3/0611 711/111 |
| 2009/0293022 A1 | 11/2009 | Fries | |
| 2012/0084521 A1* | 4/2012 | Fukui | G06F 11/1438 711/162 |
| 2013/0346615 A1 | 12/2013 | Gondi | |
| 2014/0047342 A1 | 2/2014 | Breternitz et al. | |
| 2016/0072676 A1 | 3/2016 | Gomadam et al. | |

OTHER PUBLICATIONS

Confluence, "Types of Software Licensing," Apr. 12, 2011, pp. 1-2, Retrieved From https://wikispaces.psu.edu/display/IST432SP11Team1/Types+of+Software+Licensing.
ManageEngine, ServiceDesk Plus, "Software License Types," Jan. 21, 2015, pp. 1-1000, Retrieved From https://www.manageengine.com/products/service-desk/help/adminguide/configurations/software/software-license-type.html.
EDA et al., U.S. Appl. No. 16/544,733, filed Aug. 19, 2019.

* cited by examiner

*Primary Examiner* — Camquy Truong
(74) *Attorney, Agent, or Firm* — Zilka-Kotab, P.C.

(57) ABSTRACT

A computer-implemented method according to one embodiment includes receiving a computation algorithm to be implemented by one of a plurality of nodes, determining one or more computation operations required by the computation algorithm, identifying virtualization unit metadata for each of the plurality of nodes, determining, from the plurality of nodes, an optimal node for implementing the computation algorithm based on the one or more computation operations and the virtualization unit metadata for each of the plurality of nodes, and returning an identification of the optimal node.

18 Claims, 8 Drawing Sheets

OPTIMIZING A WORKFLOW OF A STORLET ARCHITECTURE

BACKGROUND

The present invention relates to data storage, and more specifically, this invention relates to assigning computation algorithms to nodes within an object storage system.

Object storage enables the storage and management of unstructured data in the form of objects. A storlet architecture is a popular means of implementing object storage, where each node within the storlet architecture acts as a compute node (utilizing a virtualization unit) to implement computation operations (utilizing computation algorithms). However, current methods for determining a particular compute node to implement a computation algorithm are inefficient and do not consider factors such as licensing types and guidelines associated with virtualization units of compute nodes.

SUMMARY

A computer-implemented method according to one embodiment includes receiving a computation algorithm to be implemented by one of a plurality of nodes, determining one or more computation operations required by the computation algorithm, identifying virtualization unit metadata for each of the plurality of nodes, determining, from the plurality of nodes, an optimal node for implementing the computation algorithm based on the one or more computation operations and the virtualization unit metadata for each of the plurality of nodes, and returning an identification of the optimal node.

According to another embodiment, a computer program product for optimizing a workflow of a storlet architecture comprises a computer readable storage medium having program instructions embodied therewith, wherein the computer readable storage medium is not a transitory signal per se, and where the program instructions are executable by a processor to cause the processor to perform a method comprising receiving a computation algorithm to be implemented by one of a plurality of nodes, utilizing the processor, determining one or more computation operations required by the computation algorithm, utilizing the processor, identifying virtualization unit metadata for each of the plurality of nodes, utilizing the processor, determining, from the plurality of nodes, an optimal node for implementing the computation algorithm based on the one or more computation operations and the virtualization unit metadata for each of the plurality of nodes, utilizing the processor, and returning an identification of the optimal node, utilizing the processor.

A system according to another embodiment includes a processor, and logic integrated with the processor, executable by the processor, or integrated with and executable by the processor, where the logic is configured to receive a computation algorithm to be implemented by one of a plurality of nodes, determine one or more computation operations required by the computation algorithm, identify virtualization unit metadata for each of the plurality of nodes, determine, from the plurality of nodes, an optimal node for implementing the computation algorithm based on the one or more computation operations and the virtualization unit metadata for each of the plurality of nodes, and return an identification of the optimal node.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for optimizing a workflow of a storlet architecture. Various embodiments provide a method to determine an optimal node for implementing a received computation algorithm by determining computation operations within the computation algorithm and comparing the operations to virtualization unit metadata for each of a plurality of nodes.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for optimizing a workflow of a storlet architecture.

In one general embodiment, a computer-implemented method includes receiving a computation algorithm to be implemented by one of a plurality of nodes, determining one or more computation operations required by the computation algorithm, identifying virtualization unit metadata for each of the plurality of nodes, determining, from the plurality of nodes, an optimal node for implementing the computation algorithm based on the one or more computation operations and the virtualization unit metadata for each of the plurality of nodes, and returning an identification of the optimal node.

In another general embodiment, a computer program product for optimizing a workflow of a storlet architecture comprises a computer readable storage medium having program instructions embodied therewith, wherein the computer readable storage medium is not a transitory signal per se, and where the program instructions are executable by a processor to cause the processor to perform a method comprising receiving a computation algorithm to be implemented by one of a plurality of nodes, utilizing the processor, determining one or more computation operations required by the computation algorithm, utilizing the processor, identifying virtualization unit metadata for each of the plurality of nodes, utilizing the processor, determining, from the plurality of nodes, an optimal node for implementing the computation algorithm based on the one or more computation operations and the virtualization unit metadata for each of the plurality of nodes, utilizing the processor, and returning an identification of the optimal node, utilizing the processor.

In another general embodiment, a system includes a processor, and logic integrated with the processor, executable by the processor, or integrated with and executable by the processor, where the logic is configured to receive a computation algorithm to be implemented by one of a plurality of nodes, determine one or more computation operations required by the computation algorithm, identify virtualization unit metadata for each of the plurality of nodes, determine, from the plurality of nodes, an optimal node for implementing the computation algorithm based on the one or more computation operations and the virtualization unit metadata for each of the plurality of nodes, and return an identification of the optimal node.

Figure 1:
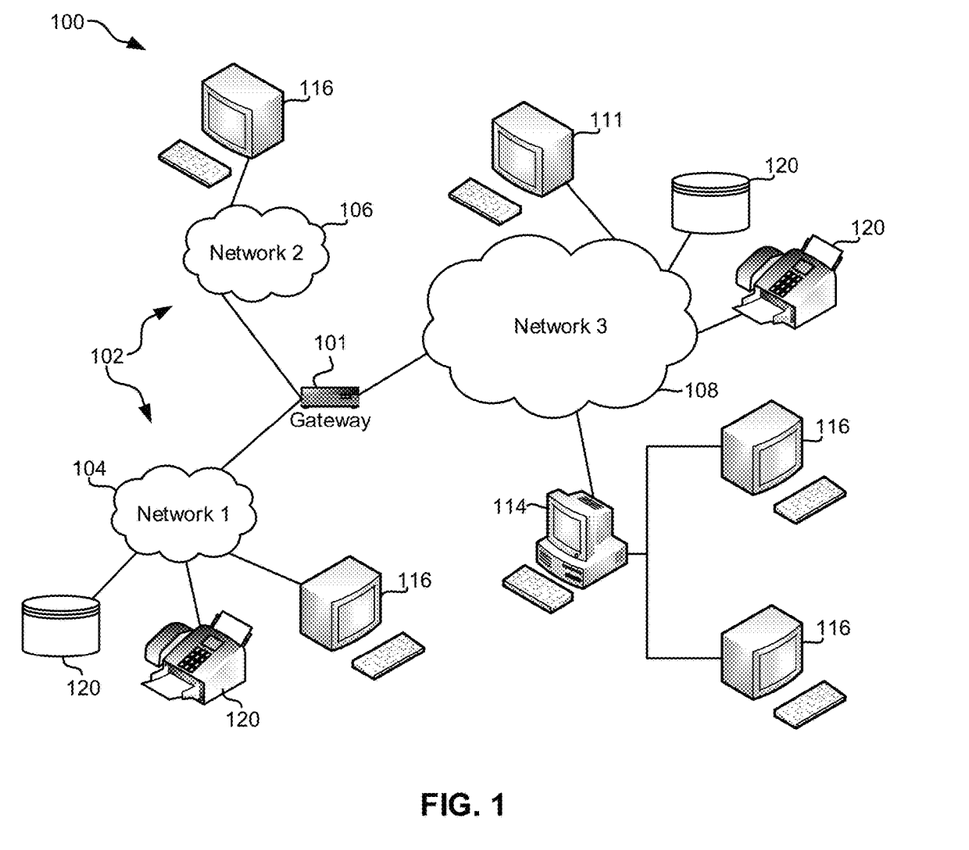
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
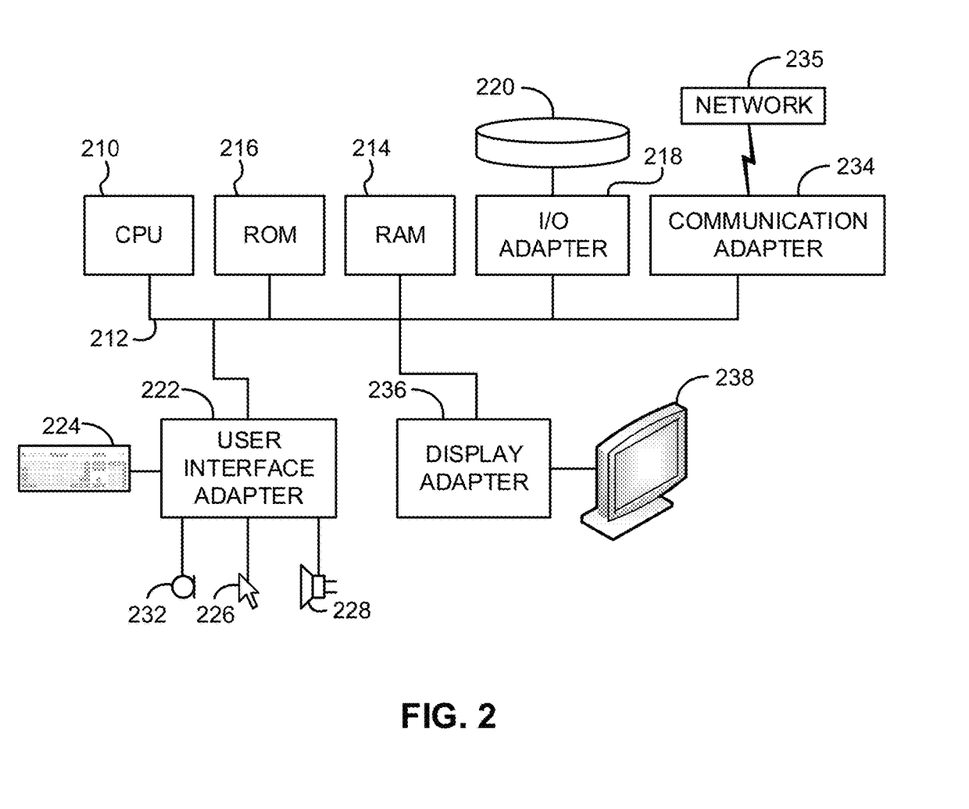
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
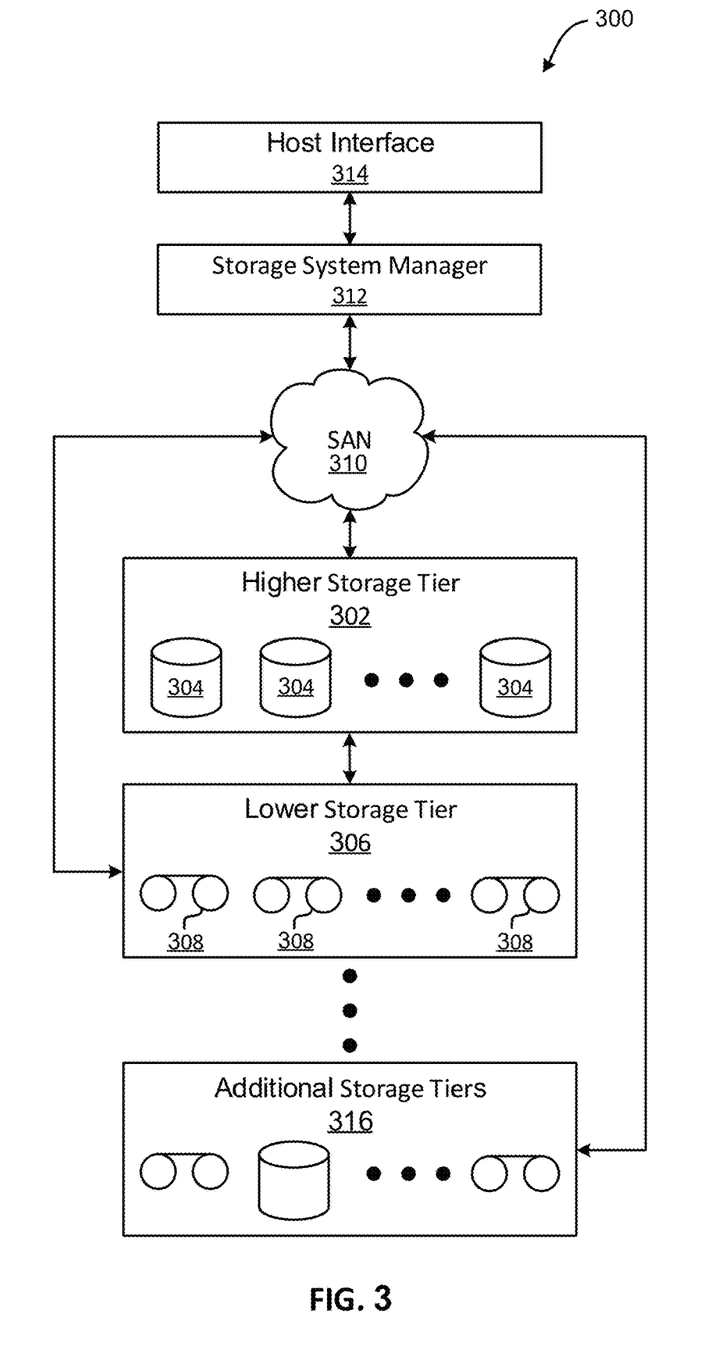
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
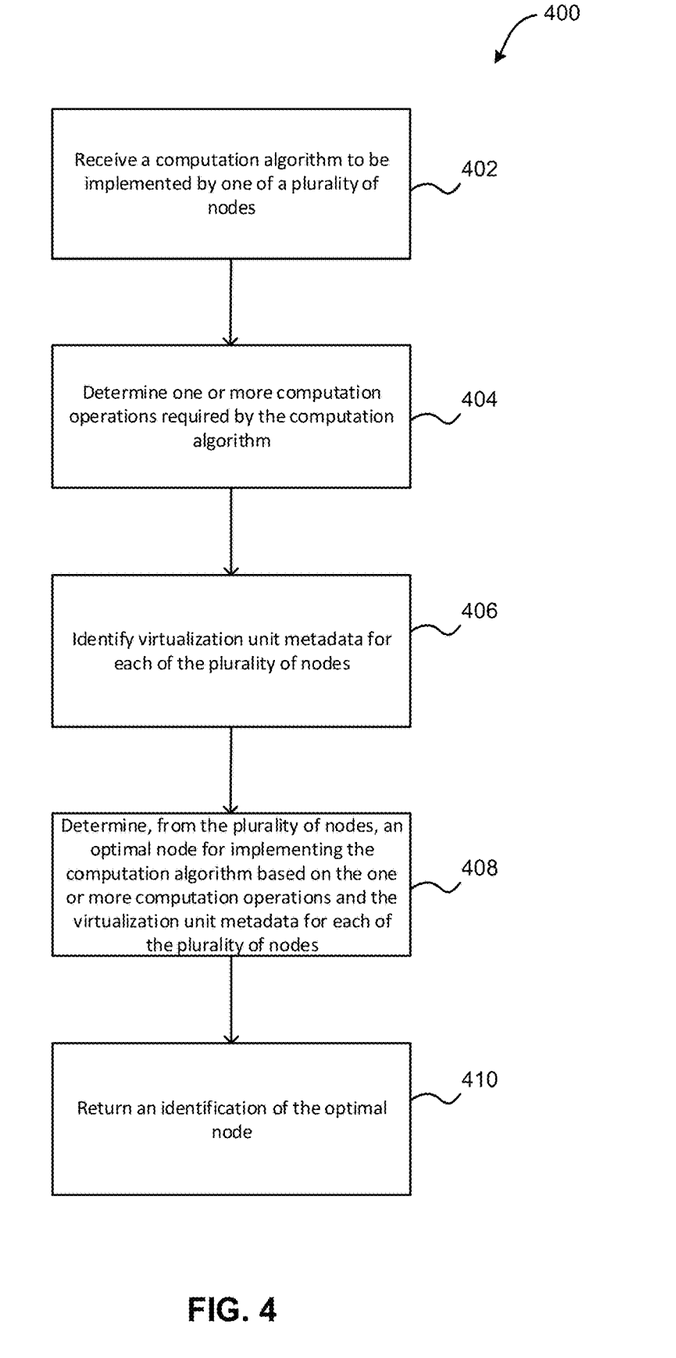
FIG. 4 illustrates a method for optimizing a workflow of a storlet architecture, in accordance with one embodiment.

Now referring to FIG. 4, a flowchart of a method 400 is shown according to one embodiment. The method 400 may be performed in accordance with the present invention in any of the environments depicted in FIGS. 1-3, 6, and 7, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a computation algorithm to be implemented by one of a plurality of nodes is received. In one embodiment, the computation algorithm may include one or more computation tasks to be performed by one of the plurality of nodes. For example, the one or more computation tasks may include one or more of collecting data, performing analytic operations, performing query operations, etc.

Additionally, in one embodiment, the plurality of nodes may include nodes within an object storage architecture. For example, the nodes may include one or more proxy nodes that are used for distributed load handling and request handling. In another example, the nodes may include one or more storage nodes that write to disk/storage subsystems.

Further, in one embodiment, the plurality of nodes may be included within a storlet architecture. For example, the storlet architecture may include a compute engine embedded object storage. In another example, each node within the storlet architecture may have an associated virtualization unit (e.g., a virtual machine, etc.). For instance, the virtualization units may include Linux® containers, a Docker® software container, a ZeroVM® process virtualization, etc.

Further still, in one embodiment, when a computation algorithm is assigned to one of the plurality of nodes, the associated virtualization unit of the node may implement the computation algorithm (e.g., by performing the one or more computation tasks indicated within the computation algorithm, etc.). In another embodiment, the computation algorithm may be deployed by an end user. For example, the computation algorithm may be deployed using a GUI, etc. In another example, the computation algorithm may be deployed utilizing a normal object PUT operation.

Also, in one embodiment, the computation algorithm may be received utilizing hooking. For example, a hook may be placed in a storlet engine execution cycle. In another example, the hook may intercept the computation algorithm as it is received within the storlet architecture.

In addition, as shown in FIG. 4, method 400 may proceed with operation 404, where one or more computation operations required by the computation algorithm are determined. In one embodiment, the one or more computation operations may be determined by parsing the computation algorithm. For example, the computation operations may include one or more actions that are performed during the implementation of the computation algorithm by a virtualization unit. In another example, the computation algorithm may be broken into a sequence of actions that are performed when the computation algorithm is implemented. In another embodiment, the algorithm may also be parsed for syntax errors.

Furthermore, as shown in FIG. 4, method 400 may proceed with operation 406, where virtualization unit metadata is identified for each of the plurality of nodes. In one embodiment, the virtualization unit metadata may include metadata describing, for each of the plurality of nodes, one or more characteristics of the virtualization unit included within that node. In another embodiment, the virtualization unit metadata may include an identifier of a node on which the virtualization unit is included (e.g., a node location, etc.).

Further still, in one embodiment, the virtualization unit metadata may include a name of an application that is implemented by the virtualization unit. In another embodiment, the virtualization unit metadata may include a type of license that has been obtained for the application that is implemented by the virtualization unit (e.g., an individual license, an OEM license, a volume license, a free license, etc.).

Also, in one embodiment, the virtualization unit metadata may include one or more guidelines for the application that is implemented by the virtualization unit. For example, the virtualization unit metadata may include one or more benefits of the virtualization unit (such as an unlimited number of users, etc.). In another example, the virtualization unit metadata may include one or more limitations of the virtualization unit (e.g., a limited number of concurrent users, limited number of simulations, etc.). In yet another example, the virtualization unit metadata may include one or more operating costs of the virtualization unit (e.g., pay per use, freeware, recurring fee, etc.).

Additionally, in one embodiment, the virtualization unit metadata may be obtained utilizing one or more daemons. For example, a daemon may be located within each of the plurality of nodes, and may collect and export the virtualization unit metadata for that node. In another embodiment, the virtualization unit metadata may be stored in a template in middleware (e.g., at a storlet scheduler, etc.).

Further, method 400 may proceed with operation 408, where an optimal node for implementing the computation algorithm is determined from the plurality of nodes, based on the one or more computation operations and the virtualization unit metadata for each of the plurality of nodes. In one embodiment, the optimal node may be determined by comparing the one or more computation operations to the virtualization unit metadata for each of the plurality of nodes. For example, the one or more computation operations may be compared to a template storing the virtualization unit metadata.

Further still, in one embodiment, the optimal node may be chosen as the node having a virtualization unit that can implement the computation algorithm with a lowest cost. For example, the cost may be monetary (e.g., the optimal node may implement the computation algorithm with the lowest virtualization unit operation cost). For instance, a node that includes a freeware virtualization unit that can implement the computation algorithm may be selected instead of virtualization unit with a pay-per-use license that can implement the computation algorithm. This may minimize CAPEX and OPEX costs associated with the implementation of the algorithm within the storlet architecture.

Also, in one embodiment, the cost may be resource-centric (e.g., the optimal node may implement the computation algorithm with the smallest impact on an amount of available resources, etc.). For example, a node that includes a virtualization unit that can implement the computation algorithm without any limits on concurrent usage may be selected instead of virtualization unit that can implement the computation algorithm that has a limit on a number of concurrent users of the virtualization unit.

In addition, in one embodiment, the determination may be based on previous node selection. For example, a user may manually determine the node for a predetermined computation algorithm. In another example, a history of manual node selection for predetermined computation algorithms may be stored and used to determine the optimal node.

Furthermore, method 400 may proceed with operation 410, where an identification of the optimal node is returned. In one embodiment, the identification may be passed from the storlet scheduler to a storlet engine. In another embodiment, the storlet engine may assign the computation algorithm to the optimal node, in response to receiving the identification.

In this way, a framework middleware may be integrated with the storlet (embed compute infrastructure built in object storage) architecture which may help in identifying and understanding the underlying licensing types, guidelines, etc. for the applications bundled within the virtualization units, as well as selecting the appropriate application and/or license sufficient for executing the deployed workload (e.g., input computation algorithm) which may help reduce resource usage, CAPEX costs, OPEX costs, etc.

Figure 5:
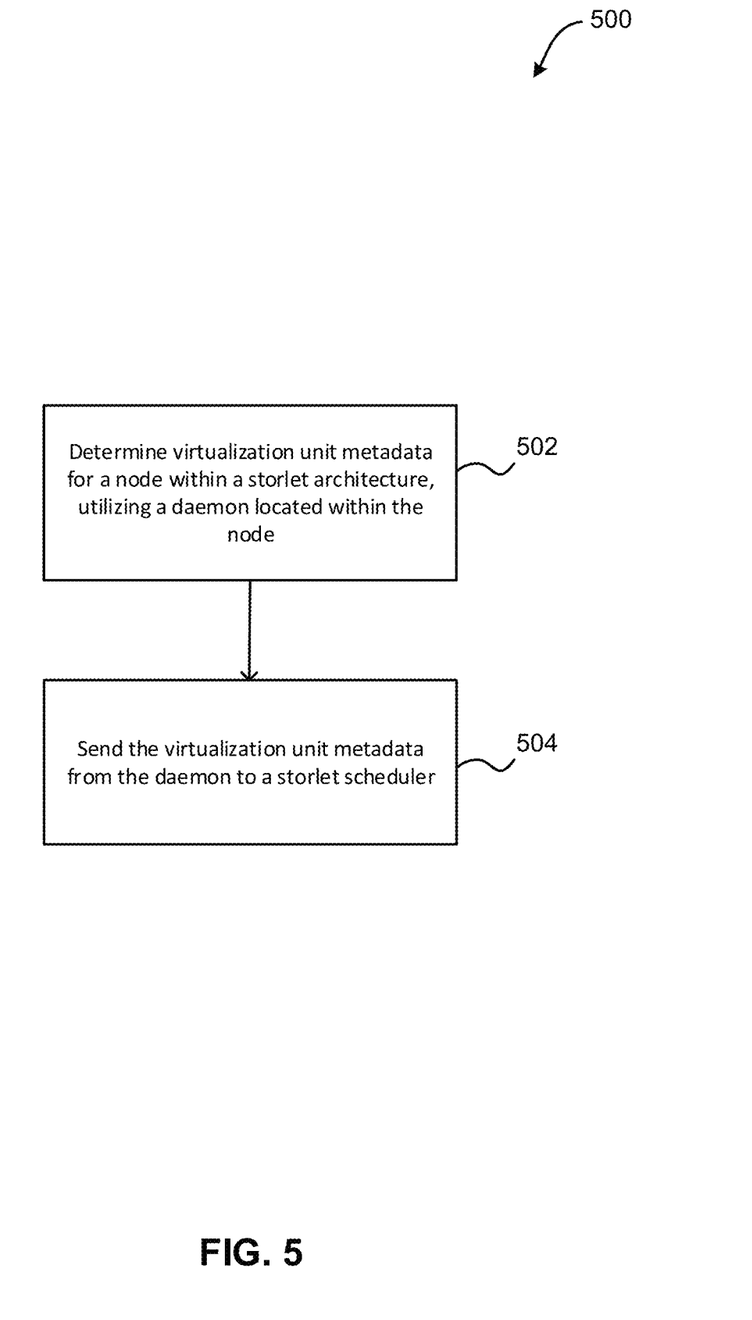
FIG. 5 illustrates a method for retrieving virtualization unit metadata, in accordance with one embodiment.

Now referring to FIG. 5, a flowchart of a method 500 for retrieving virtualization unit metadata is shown according to one embodiment. The method 500 may be performed in accordance with the present invention in any of the environments depicted in FIGS. 1-3, 6, and 7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where virtualization unit metadata is determined for a node within a storlet architecture, utilizing a daemon located within the node. Additionally, method 500 may proceed with operation 504, where the virtualization unit metadata is sent from the daemon to a storlet scheduler. In one embodiment, the storlet scheduler may include middleware within the storlet architecture. In another embodiment, the virtualization unit metadata may be stored in a template within the storlet scheduler.

Figure 6:
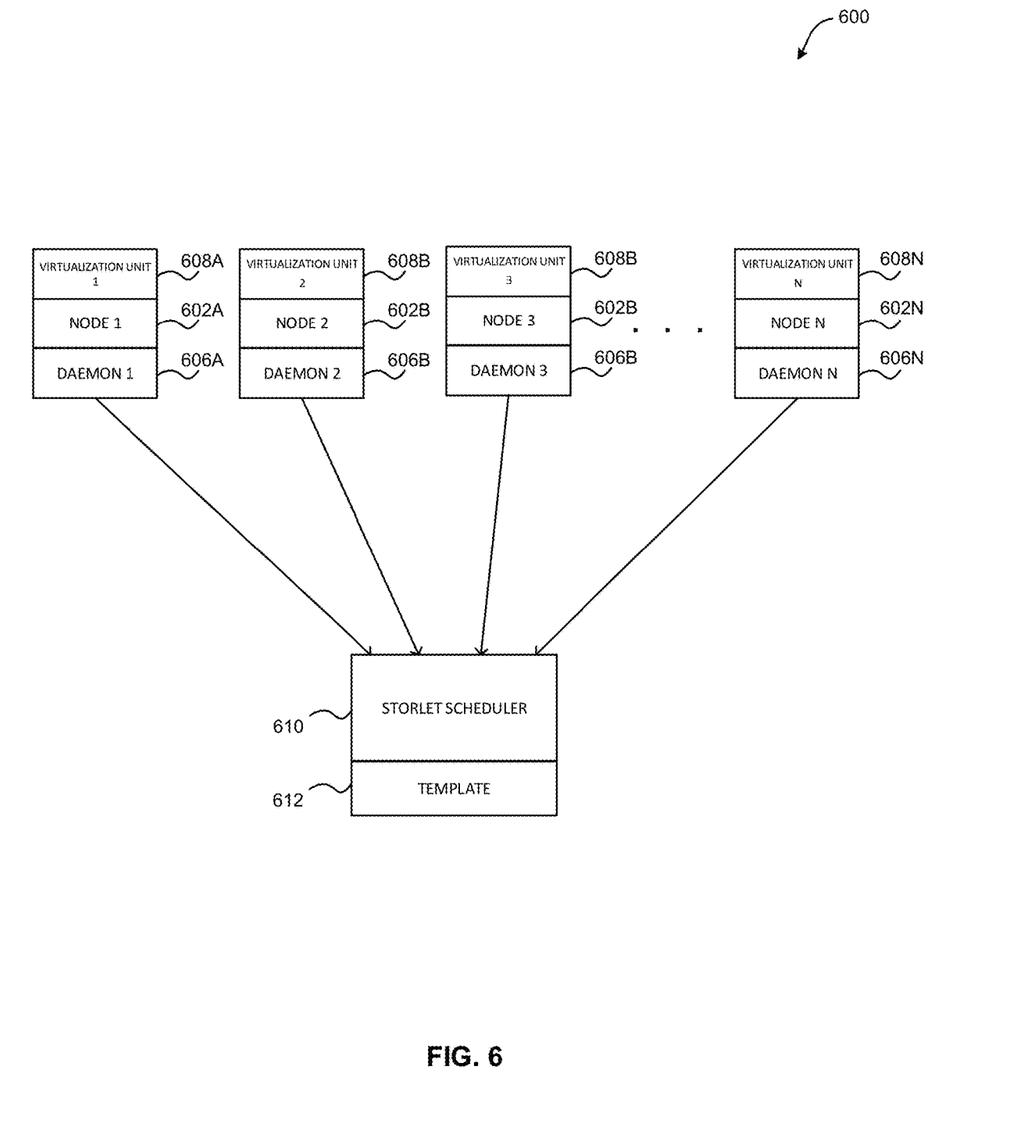
FIG. 6 illustrates an exemplary framework for collecting and exporting virtualization unit metadata, in accordance with one embodiment.

FIG. 6 illustrates an exemplary framework 600 for collecting and exporting virtualization unit metadata, according to one embodiment. As shown, a plurality of object storage nodes 602A-N are included within an object storage cluster. In one embodiment, each of the plurality of object storage nodes 602A-N may include one of two entities/node groups. For example, one or more of the plurality of object storage nodes 602A-N may include a proxy node which may be used for distributed load handling/request handling into the namespace. In another example, one or more of the plurality of object storage nodes 602A-N may include a storage node that is responsible for writing into disks/storage subsystems.

Additionally, each of the plurality of object storage nodes 602A-N includes its own virtualization unit 608A-N. In one embodiment, the virtualization units 608A-N may each include a software engine present within the object storage nodes 602A-N that performs computation tasks. In one embodiment, an end user may frame a computation algorithm, which may be deployed or passed to one of the virtualization units 608A-N as a normal object PUT operation. In another embodiment, the virtualization units 608A-N may not require any additional client or compute node to perform analysis of the data. For example, the object storage nodes 602A-N may act as compute nodes and may return results back to the user.

Further, each of the plurality of object storage nodes 602A-N includes its own daemon 606A-N. In one embodiment, for each of the plurality of object storage nodes 602A-N, the daemon 606A-N located on that node may collect virtualization unit metadata for the virtualization unit 608A-N located on that node. For instance, the daemon 606A may collect virtualization unit metadata for the virtualization unit 608A located on the object storage node 602A, the daemon 606B may collect virtualization unit metadata for the virtualization unit 608B located on the object storage node 602A, etc.

Further still, in one embodiment, the virtualization unit metadata may include licensing types and/or guidelines of applications bundled with each virtualization unit 608A-N. For example, the virtualization unit metadata may include an indication of a software licensing model used by the virtualization unit. Table 1 illustrates exemplary software licensing models that may be included as virtualization unit metadata, in accordance with one embodiment. Of course, it should be noted that the exemplary software licensing models shown in Table 1 is set forth for illustrative purposes only, and thus should not be construed as limiting in any manner.

TABLE 1

Public domain software (Freeware, Open Source)
Commercial Software (Shareware, Limited License, Unlimited License, Volume Purchase Agreement)
Individual: License type for single installation
OEM (Original Equipment Manufacturers): License type for software that is already installed in the hardware
Named User License: License Type for a specific user
Volume: License Type supporting multiple users
Client Access License: License type that gives a user the rights to access the services of the server
Trial License: License Type for trial versions of software
Enterprise (Perpetual): License Type that does not require renewal and is for life long
Concurrent License: License Type for software that can be accessed by a specific number of users at a time
Free License: License Type for freeware software
Enterprise Subscription: License Type that requires renewal for every specific period
Node Locked: License Type for workstations with specific configurations Table 2 illustrates exemplary virtualization unit metadata that may be collected by the daemons 606A-N, in accordance with one embodiment. Of course, it should be noted that the exemplary virtualization unit metadata shown in Table 2 is set forth for illustrative purposes only, and thus should not be construed as limiting in any manner.

TABLE 2 image1@capabilties = {location: node-1; application: "Oracle XE"; license_type: free; license_ guidelines: "free to develop, package"}
image2@capabilties = {location: node-2; application: "Microsoft SQL Server"; license_type: concurrent; license_ guidelines: "two concurrent users"}
image3@capabilties = {location: node-3; application: "ModelSim"; license_type: Evaluation; license_ guidelines: "no. of devices that can be simulated 100"}
image4@capabilties = {location: node-4; application: "Synopsis"; license_type: Floating; license_guidelines: "pay per usage of license"}

Also, each of the daemons 606A-N are in communication with a storlet scheduler 610. In one embodiment, each of the daemons 606A-N may report their collected virtualization unit metadata to the storlet scheduler 610. In another embodiment, the storlet scheduler 610 may store the received virtualization unit metadata in a template 612.

Figure 7:
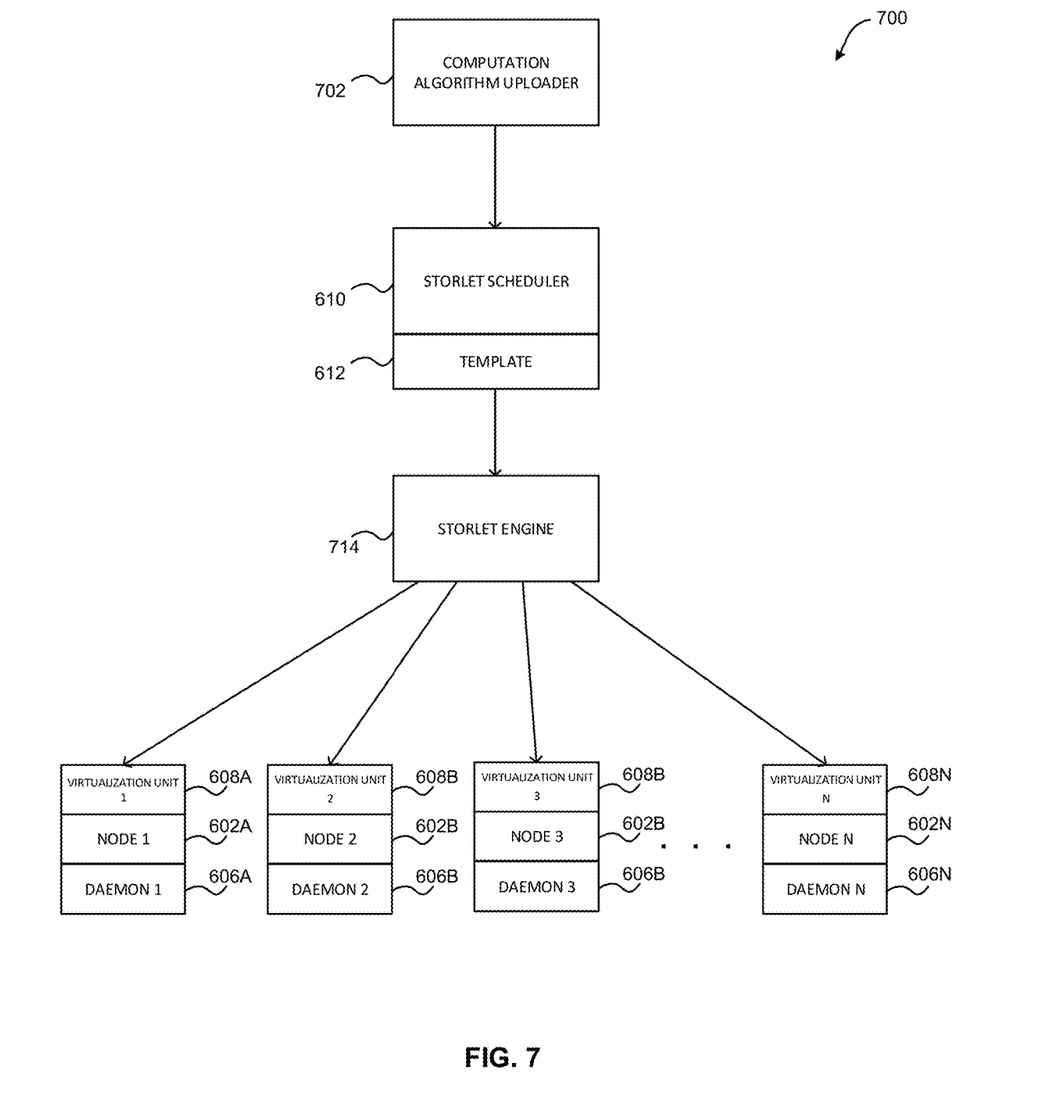
FIG. 7 illustrates an exemplary storlet workflow optimization framework, in accordance with one embodiment.

FIG. 7 illustrates an exemplary storlet workflow optimization framework 700, according to one embodiment. As shown, a computation algorithm uploader 702 is in communication with a storlet scheduler 610. In one embodiment, the computation algorithm uploader 702 may enable a user to upload a computation algorithm for execution by a virtualization unit 608A-N of an object storage node 602A-N within an object storage cluster. For example, the computation algorithm uploader 702 may include an object storage interface that requests a user ID and password. In another example, the computation algorithm uploader 702 may include a computation algorithm upload interface that enables the uploading of a computation algorithm.

Additionally, the storlet scheduler 610 may obtain the computation algorithm uploaded by the computation algorithm uploader 702. In one embodiment, the storlet scheduler 610 may utilize a hook to intercept the computation algorithm as it is received via the computation algorithm uploader 702. In another embodiment, the storlet scheduler 610 may parse and analyze the intercepted computation algorithm, and may compare the parsed and analyzed information to the virtualization unit metadata stored in a template 612.

Further, in one embodiment, based on the parsing and analyzing of the computation algorithm, and the comparing of the computation algorithm to the virtualization unit metadata, the storlet scheduler 610 may automatically determine a license type to be used to execute the computation algorithm.

Table 3 illustrates an exemplary license type determination, in accordance with one embodiment. Of course, it should be noted that the exemplary determination shown in Table 3 is set forth for illustrative purposes only, and thus should not be construed as limiting in any manner.

TABLE 3

Computation algorithm-1 (Involves metadata query operations, estimated 50 object processing) -> Oracle XE (Free)
Computation algorithm-2 (Involved Backup of metadata queries) -> Microsoft SQL server
Computation algorithm-3 (Involved simulation of devices under 100) -> ModelSim
Computation algorithm-4 (Involved physical layer verification) -> Synopsys In one embodiment, the storlet scheduler 610 may also support a manual determination of a license type required for the computation algorithm (e.g., utilizing an auto learning platform, etc.). In another embodiment, the storlet scheduler 610 may keep track of the license model for each application bundled in each virtualization unit 608A-N, as well as the location of each object storage node 602A-N. The storlet scheduler 610 may also keep track of the complexity of the computation algorithm. Based on these two parameters, the storlet scheduler 610 may help the storlet engine 714 to determine the appropriate virtualization unit 608A-N and object storage node 602A-N to be selected for processing the deployed computation algorithm in order to minimize available resource utilization, minimize CAPEX or OPEX costs, etc.

Figure 8:
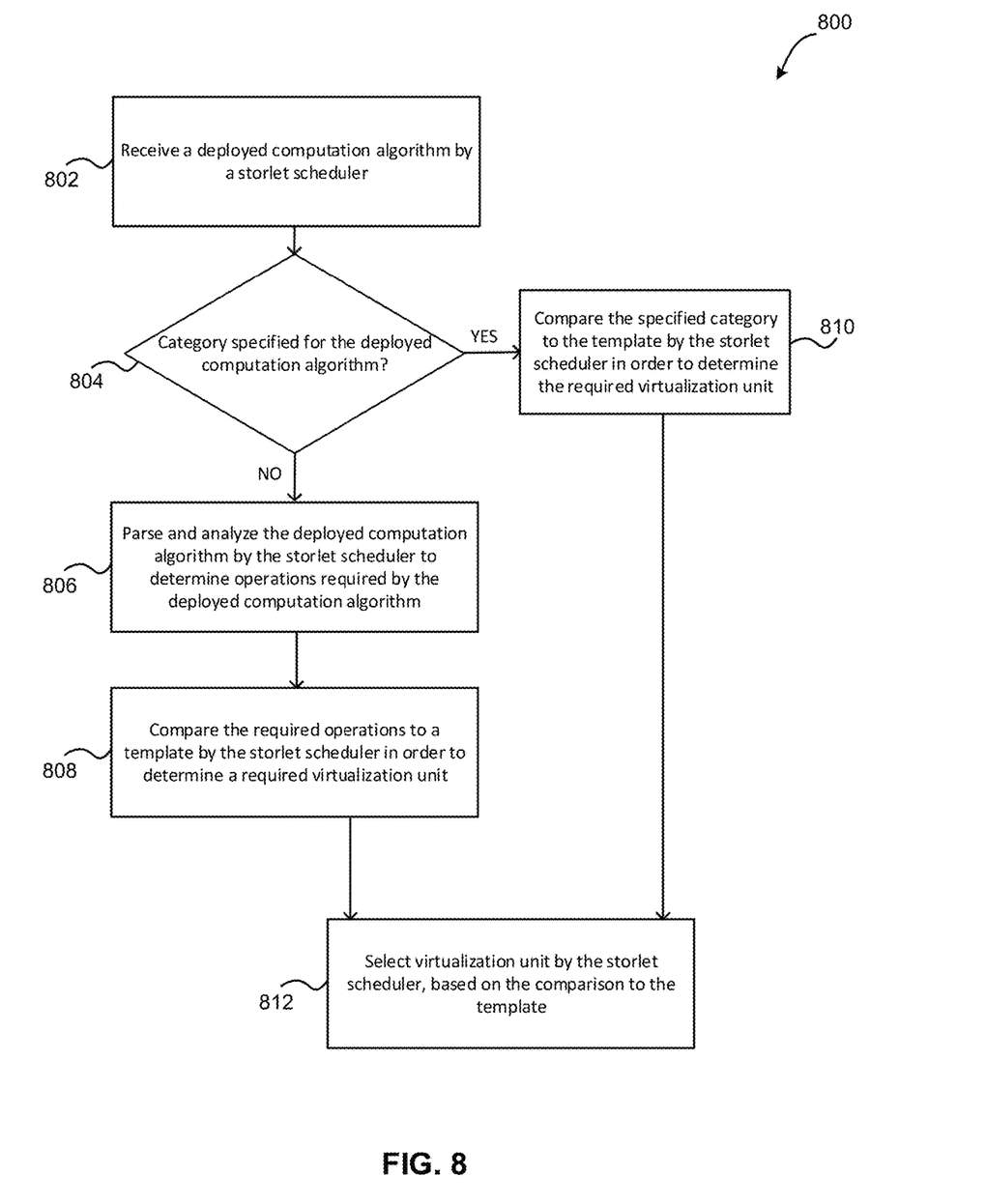
FIG. 8 illustrates a method for determining a virtualization unit to implement a deployed computation algorithm, in accordance with one embodiment.

Now referring to FIG. 8, a flowchart of a method 800 for determining a virtualization unit to implement a deployed computation algorithm is shown according to one embodiment. The method 800 may be performed in accordance with the present invention in any of the environments depicted in FIGS. 1-3, 6, and 7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a deployed computation algorithm is received by a storlet scheduler. Additionally, method 800 may proceed with decision 804, where it is determined by the storlet scheduler whether a category has been specified for the deployed computation algorithm. For example, the category may include a type of virtualization unit required to execute the deployed computation algorithm (e.g., a freeware application, a commercial application, an evaluation application, a pay-per-use application, etc.).

If it is determined in decision 804 that a category has not been specified for the deployed computation algorithm, then method 800 may proceed with operation 806, where the deployed computation algorithm is parsed and analyzed by the storlet scheduler to determine operations required by the deployed computation algorithm. Additionally, method 800 may proceed with operation 808, where the required operations are compared to a template by the storlet scheduler in order to determine a required virtualization unit.

Table 4 illustrates an exemplary template, in accordance with one embodiment. Of course, it should be noted that the exemplary template shown in Table 4 is set forth for illustrative purposes only, and thus should not be construed as limiting in any manner.

TABLE 4

| Computation Operation | Category | Required Virtualization Unit |
|---|---|---|
| Metadata query <=50 objects | Freeware | Oracle XE ® |
| Metadata query >50 objects | Commercial | Microsoft SQL ® |

TABLE 4-continued

| Computation Operation | Category | Required Virtualization Unit |
|---|---|---|
| Physical device simulation <100 devices | Evaluation | ModelSim ® |
| Physical device simulation >100 devices | Pay per use | Synopsis ® |

In one embodiment, the template may be created utilizing virtualization unit metadata retrieved from a plurality of virtualization units located on a plurality of object storage nodes.

If it is determined in decision 804 that a category has been specified for the deployed computation algorithm, then method 800 may proceed with operation 810, where the specified category is compared to the template by the storlet scheduler in order to determine the required virtualization unit. Additionally, method 800 may proceed with operation 812, where a virtualization unit is selected by the storlet scheduler, based on the comparison to the template. In one embodiment, the selected virtualization unit may be sent by the storlet scheduler to a storlet engine. The storlet engine may then send the deployed computation algorithm to the selected virtualization unit on an object storage node for processing.

In this way, the selected virtualization unit may be used to process the deployed computation algorithm, and may result in minimized available resource utilization, minimized CAPEX or OPEX costs, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving a computation algorithm to be implemented by one of a plurality of nodes;
   determining one or more computation operations required by the computation algorithm;
   identifying virtualization unit metadata for each of the plurality of nodes, the virtualization unit metadata including one or more guidelines for an application that is implemented by a virtualization unit, where the one or more guidelines include one or more benefits of a virtualization unit, one or more limitations of the virtualization unit, and one or more operating costs of the virtualization unit;

determining, from the plurality of nodes, an optimal node for implementing the computation algorithm based on the one or more computation operations and the virtualization unit metadata for each of the plurality of nodes; and returning an identification of the optimal node.

2. The computer-implemented method of claim 1, wherein the plurality of nodes is included within a storlet architecture.

3. The computer-implemented method of claim 1, wherein the computation algorithm is received utilizing hooking.

4. The computer-implemented method of claim 1, wherein the one or more computation operations are determined by parsing the computation algorithm.

5. The computer-implemented method of claim 1, wherein the virtualization unit metadata further includes metadata describing, for each of the plurality of nodes, one or more characteristics of the virtualization unit included within that node.

6. The computer-implemented method of claim 1, wherein the virtualization unit metadata further includes an identifier of a node on which the virtualization unit is included.

7. The computer-implemented method of claim 1, wherein the virtualization unit metadata further includes a name of the application that is implemented by the virtualization unit.

8. The computer-implemented method of claim 1, wherein the virtualization unit metadata further includes a type of license that has been obtained for the application that is implemented by the virtualization unit.

9. The computer-implemented method of claim 1, wherein the optimal node is determined by comparing the one or more computation operations to the virtualization unit metadata for each of the plurality of nodes to identify a node having the virtualization unit that can implement the computation algorithm with a lowest cost.

10. A computer program product for optimizing a workflow of a storlet architecture, the computer program product comprising a computer readable storage medium having program instructions embodied therewith, wherein the computer readable storage medium is not a transitory signal per se, the program instructions executable by a processor to cause the processor to perform a method comprising:

receiving a computation algorithm to be implemented by one of a plurality of nodes, utilizing the processor;

determining one or more computation operations required by the computation algorithm, utilizing the processor;

identifying virtualization unit metadata for each of the plurality of nodes, utilizing the processor, the virtualization unit metadata including one or more guidelines for an application that is implemented by a virtualization unit, where the one or more guidelines include one or more benefits of a virtualization unit, one or more limitations of the virtualization unit, and one or more operating costs of the virtualization unit;

determining, from the plurality of nodes, an optimal node for implementing the computation algorithm based on the one or more computation operations and the virtualization unit metadata for each of the plurality of nodes, utilizing the processor; and returning an identification of the optimal node, utilizing the processor.

11. The computer program product of claim 10, wherein the plurality of nodes is included within a storlet architecture.

12. The computer program product of claim 10, wherein the computation algorithm is received utilizing hooking.

13. The computer program product of claim 10, wherein the one or more computation operations are determined by parsing the computation algorithm.

14. The computer program product of claim 10, wherein the virtualization unit metadata further includes metadata describing, for each of the plurality of nodes, one or more characteristics of the virtualization unit included within that node.

15. The computer program product of claim 10, wherein the virtualization unit metadata further includes an identifier of a node on which the virtualization unit is included.

16. The computer program product of claim 10, wherein the virtualization unit metadata further includes a name of the application that is implemented by the virtualization unit.

17. The computer program product of claim 10, wherein the virtualization unit metadata includes a type of license that has been obtained for the application that is implemented by the virtualization unit.

18. A system, comprising:

a processor; and logic integrated with the processor, executable by the processor, or integrated with and executable by the processor, the logic being configured to:

receive a computation algorithm to be implemented by one of a plurality of nodes;

determine one or more computation operations required by the computation algorithm;

identify virtualization unit metadata for each of the plurality of nodes, the virtualization unit metadata including one or more guidelines for an application that is implemented by a virtualization unit, where the one or more guidelines include one or more benefits of a virtualization unit, one or more limitations of the virtualization unit, and one or more operating costs of the virtualization unit;

determine, from the plurality of nodes, an optimal node for implementing the computation algorithm based on the one or more computation operations and the virtualization unit metadata for each of the plurality of nodes; and return an identification of the optimal node.

* * * * *